(12) United States Patent
Aubin et al.

(10) Patent No.: US 12,703,408 B2
(45) Date of Patent: Aug. 11, 2026

(54) MECHANICAL GUARD BOT BLOCKING SYSTEM

(71) Applicant: Symbotic LLC, Wilmington, MA (US)

(72) Inventors: Joseph Aubin, Hollis, NH (US); Alan Grant, Nashua, NH (US); William J. Fosnight, Windham, NH (US); Frederick M. Morgan, Bedford, NH (US); Karl Koch, North Billerica, MA (US); Michael Chesna, Saugus, MA (US)

(73) Assignee: Symbotic LLC, Wilmington, MA (US)

( * ) Notice: Subject to any disclaimer, the term of this patent is extended or adjusted under 35 U.S.C. 154(b) by 1159 days.

(21) Appl. No.: 17/684,552

(22) Filed: Mar. 2, 2022

(65) Prior Publication Data

US 2022/0281494 A1 Sep. 8, 2022

Related U.S. Application Data

(60) Provisional application No. 63/157,580, filed on Mar. 5, 2021.

(51) Int. Cl.

*B61H 11/00* (2006.01)
*B60T 7/22* (2006.01)
*B65G 1/04* (2006.01)

(52) U.S. Cl.

CPC ................ *B61H 11/00* (2013.01); *B60T 7/22* (2013.01); *B65G 1/0492* (2013.01)

(58) Field of Classification Search

None

See application file for complete search history.

(56) References Cited

U.S. PATENT DOCUMENTS 8,694,152 B2 * 4/2014 Cyrulik ................ B65G 47/883 700/214
9,205,979 B2 * 12/2015 Steinbach ............ B65G 1/0492
10,150,615 B2 * 12/2018 Van Den Berk ..... B65G 1/0492
11,623,342 B2 * 4/2023 Coady .................... B25J 9/1676 700/79
2016/0311617 A1 10/2016 Van Den Berk
2023/0219754 A1 * 7/2023 Vent ..................... B65G 1/0492 414/266

* cited by examiner

*Primary Examiner* — Mark C Hageman

(74) *Attorney, Agent, or Firm* — Perman & Green, LLP

(57) ABSTRACT

An automated order fulfillment facility including one or more rows of storage locations for storing totes or other containers, mobile robots configured to move along and/or between rails to transfer the totes or other containers to and from the storage locations, and an energy absorbing mechanical guard mounted at a point along the rails to block or stop a runaway mobile robot. The energy absorbing mechanical guard may be configured to stop mobile robots traveling at a maximum rate of speed for the mobile robots, without damaging the mobile robots.

27 Claims, 9 Drawing Sheets

MECHANICAL GUARD BOT BLOCKING SYSTEM

PRIORITY DATA

The present application claims priority to U.S. Provisional Patent Application No. 63/157,580, filed on Mar. 5, 2021, entitled "Mechanical Guard Bot Blocking System", which application is incorporated by reference herein in its entirety.

BACKGROUND

An order-fulfillment system for use in supply chains, for example in retail supply chains, may fulfill orders for individual product units, referred to herein as "eaches" (also called "pieces", "inventory", "items" or, generally, any articles available for purchase in retail as a purchase unit, etc.). Order fulfillment facilities typically include a storage structure including for example multiple horizontal rows of storage locations for storing eaches in totes or containers, and mobile robots configured to move on rails adjacent the rows of storage locations to transfer the totes or containers to and from the storage locations. While the movement of the mobile robots may be highly controlled, it is desirable to safeguard against a runaway robot which malfunctions and moves uncontrolled along a rail.

SUMMARY

The present technology, roughly described, relates to an automated order fulfillment facility including one or more rows of storage locations for storing totes or other containers, mobile robots configured to move along and/or between rails to transfer the totes or other containers to and from the storage locations, and an energy absorbing mechanical guard mounted at a point along the rails to block or stop a runaway mobile robot. The energy absorbing mechanical guard may be configured to stop mobile robots traveling at a maximum rate of speed for the mobile robots, without damaging the mobile robots. The energy absorbing mechanical guard also establishes a safety barrier for any technicians working in an area of the order fulfillment facility adjacent the areas where mobile robots travel.

In embodiments, the energy absorbing mechanical guard is vertically mounted to stop runaway mobile robots travelling horizontally along the rows of storage locations. However, in further embodiments, the energy absorbing mechanical guard may be horizontally mounted to stop runaway mobile robots travelling vertically between the rows of storage locations.

In one example, the present technology relates to a system for stopping mobile robots moving in a structure, the structure comprising multiple levels, the system comprising: an energy absorbing mechanical guard configured to affix to a structure within which the mobile robots move, and configured to stop the moving mobile robots upon impact with the energy absorbing mechanical guard; wherein the energy absorbing mechanical guard is configured to span at least some of the multiple levels of the structure.

In a further example, the present technology relates to a system for stopping mobile robots in manufacturing facility, the system comprising: a storage structure used to store inventory for an automatic storage and retrieval system, the storage structure comprising multiple levels for storing inventory, the storage structure having an end at which the multiple levels terminate; and an energy absorbing mechanical guard configured to be affix to the end of storage structure, the energy absorbing mechanical guard further configured to stop the moving mobile robots upon impact with the energy absorbing mechanical guard; wherein the energy absorbing mechanical guard is configured to span at least some of the multiple levels of the storage structure.

In another example, the present technology relates to a method of blocking mobile robots in an automatic storage and retrieval system, comprising: a) configuring an energy absorbing mechanical guard with multiple energy absorbers; b) positioning the energy absorbing mechanical guard within a storage structure of the automatic storage and retrieval system, or at an end of the storage structure of the automatic storage and retrieval system, to span multiple levels of the storage structure, the energy absorbing mechanical guard aligning the energy absorbers on the multiple levels of the storage structure; and c) blocking mobile robots on the multiple levels of the storage structure by receiving a mobile robot on a level and absorbing the kinetic energy of the mobile robot to stop the mobile robot.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments of the present technology will be described with reference to the following figures.

DESCRIPTION

Figure 1:
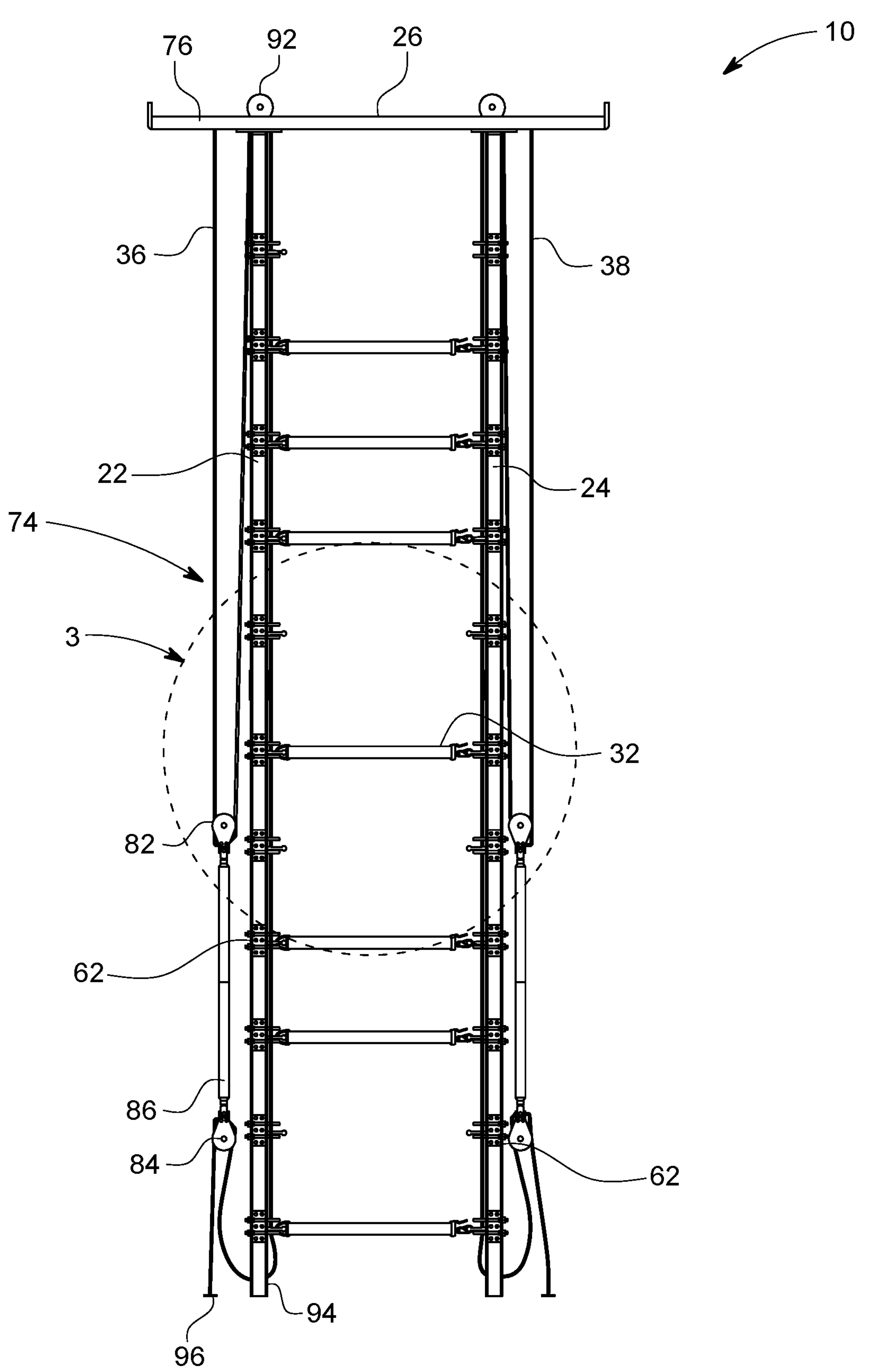
FIGS. 1 and 2 are an end view and an isometric view, respectively, of a mechanical guard blocking apparatus according to embodiments of the present technology.

The disclosed embodiment may be described as a safety blocking apparatus for use in automation applications such as with ASRS (Automated Storage and Retrieval Systems) used in supply chains, for example in retail supply chains. The embodiment is disclosed for absorbing energy in ASRS applications for use with mobile robots, the embodiment can be used in other applications, such as storage and retrieval of parts and work-in-process within manufacturing operations, one field of use is order-fulfillment in retail supply chains.

The disclosed embodiment may contain features as disclosed in co-pending U.S. patent application Ser. No. 15/838,836 having United States Patent Publication Number US2019/0176323A1 entitled "CONFIGURABLE SERVICE ISOLATION ZONES FOR SERVICE OF EQUIPMENT EMPLOYING MOBILE ROBOTS" and having a file date of Dec. 12, 2017. The disclosure of said patent application is hereby incorporated by reference in its entirety.

The disclosed embodiment may integrated with automated storage and retrieval systems, picking systems or otherwise as disclosed in U.S. Pat. No. 10,179,700 issued Jan. 15, 2019 and entitled "Automated System for Transferring Payloads", U.S. Pat. No. 10,435,241 issued Oct. 8, 2019 and entitled "Storage and Retrieval System", United States Patent Publication Number US2017/0313514A1 entitled "Automated Decant System" and having a publication date of Nov. 2, 2017, the disclosure of all of said patent publications hereby incorporated by reference in their entirety.

The disclosed embodiment may interface with automation or other suitable features of systems or otherwise as disclosed in United States Patent Publication Number US2018/0194556A1 entitled "Interchangeable Automated Mobile Robots with a Plurality of Operating Modes Configuring a Plurality of Different Robot Task Assignments" and having a publication date of Jul. 12, 2018, in United States Patent Publication Number US2018/0150793A1 entitled "Automated Retail Supply Chain and Inventory Management System" and having a publication date of May 31, 2018, in United States Patent Publication Number US2018/0247257A1 entitled "Inventory Management System and Method" and having a publication date of Aug. 30, 2018, the disclosure of all of said patent publications hereby incorporated by reference in their entirety.

The present embodiment relates to a blocking apparatus used in a safety system for safe operation of an automated order fulfillment facility and servicing of areas within an automated order fulfillment facility in which many or all robots can access each storage location. During normal operation, a number of battery-powered robots receive wireless instructions from a management control system (MCS) to transfer items to/from a number of workstations and storage shelves. While the storage shelves may be arranged in a wide variety of configurations, in one example, the storage shelves may be arrayed in multiple aisles, with each aisle including a two-dimensional array of storage shelves arrayed in rows and columns on each side of the aisle. The robots may travel between different aisles on a deck. In embodiments, there may be multiple levels of decks. In accordance with aspects of the present technology, the order fulfillment facility may be divided into one or more service zones defined by mechanical guards blocking all access points to a defined service zone so as to completely isolate the service zone against entry by a mobile robot. The size of a service zone may be dynamically configured, depending on which combination of mechanical guards are deployed to isolate the service zone. In combination with isolating service zones, in the instance a robot "runs away" uncontrollably, a given mechanical guard needs to be capable of absorbing the energy associated with safely stopping the robot without the robot escaping the service zone. By way of non-limiting example, each aisle in the storage and retrieval system may include multiple stacked paths supporting bots on multiple levels with a two-dimensional array of storage shelves arrayed in rows and columns on each side of the aisle. Here, the robots may travel on different levels within a given aisle where the termination or end of the aisle may be at a peripheral edge of a safety zone where humans can't enter safely. The disclosed embodiment may be used alone or in combination with a secondary mechanical blocking apparatus to prevent humans from entering the aisle and also stop and absorb energy associated with a robot that "runs away" uncontrollably retaining the robot within the restricted area and not harming the humans outside of the restricted area. Accordingly, the disclosed embodiment may be used in such instance or as a mechanical barrier at other access points at the system or to block access within the system.

Figure 2:
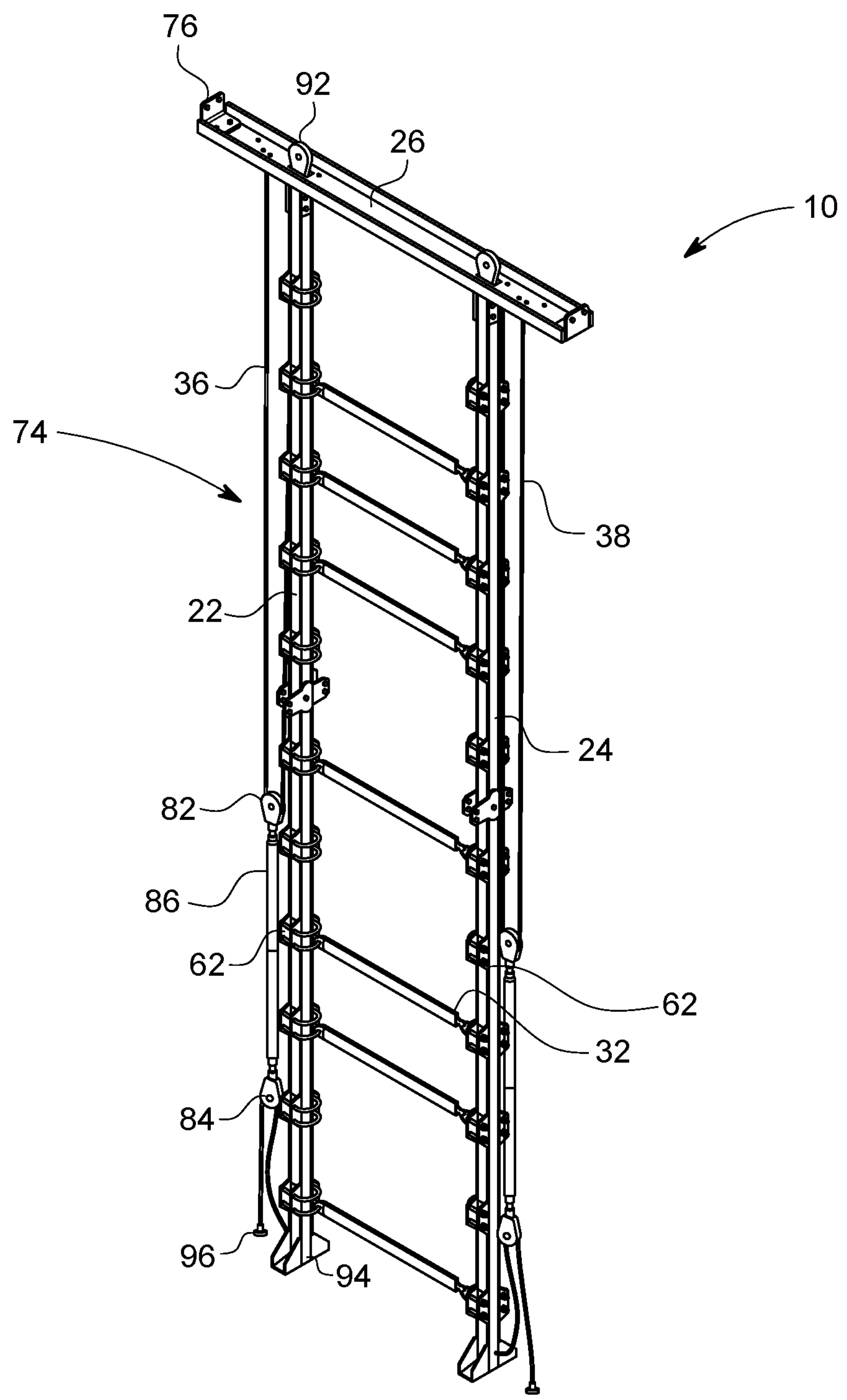
Figure 3:
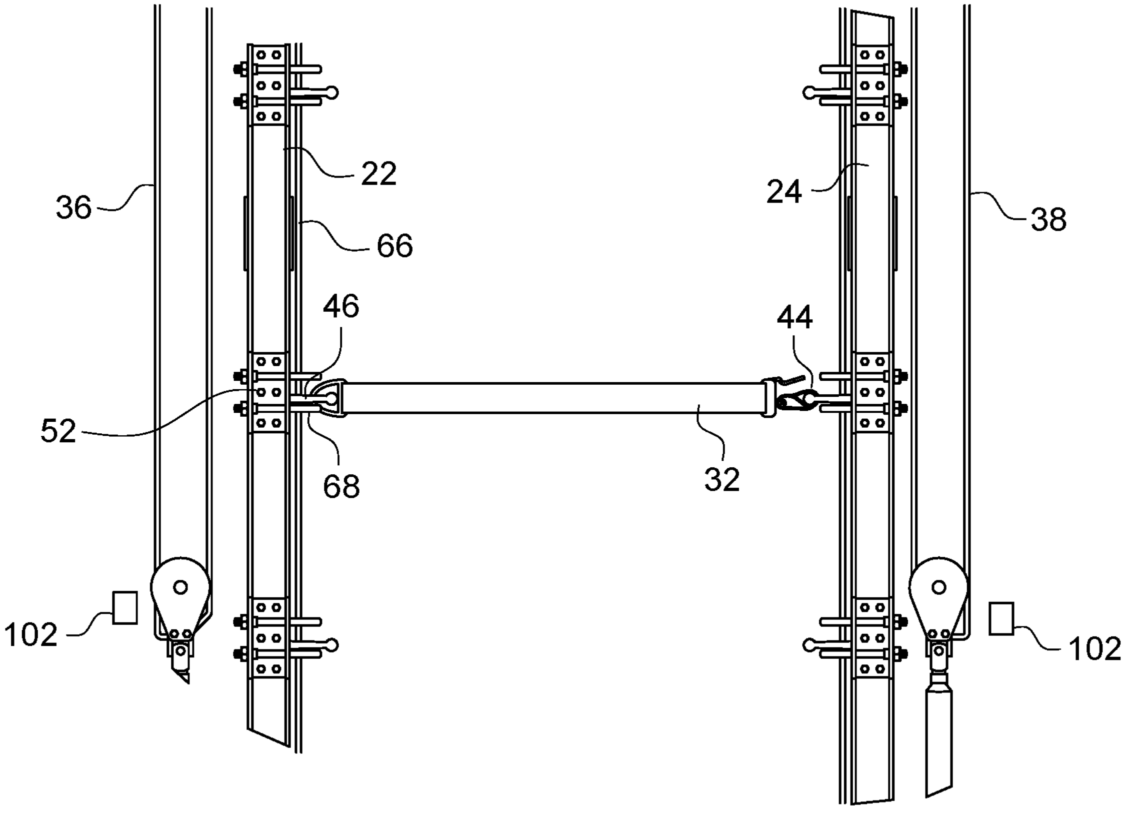
FIG. 3 is a partial end view of a mechanical guard blocking apparatus according to embodiments of the present technology.

Referring to FIG. 1, there is shown an end view of a mechanical guard blocking apparatus 10. Referring also to FIG. 2, there is shown an isometric view of a mechanical guard blocking apparatus 10. Mechanical guard blocking apparatus 10 has vertical supports 22, 24 and horizontal crossmember 26 tying the vertical supports 22, 24 together. The lower ends of vertical supports 22, 24 are grounded to a base, for example with brackets and bolts to concrete such that vertical supports 22, 24 are stationary with respect to each other. Vertical supports 22, 24 and horizontal crossmember 26 are shown as exemplary structure, these members and their function may be integrated in or any suitable portion of the structure in which the mechanical guard blocking feature is needed. For example, the mechanical guard blocking features disclosed may be integrated into the structure associated at the end of an aisle of any suitable ASRS with different levels. Robots may travel on different levels within the aisle where the termination or end of the aisle may be at a peripheral edge of a safety zone where humans can't enter safely. In alternate aspects, mechanical guard blocking apparatus 10 may be mounted independent of the structure, for example where the impact load is directed to the concrete floor as opposed to being reacted by the storage structure. The present technology comprises energy absorbing mechanical guards, which in embodiments may be straps 32 and first and second cable assemblies 36, 38. Straps 32 may be provided coupled to first and second cable assemblies 36, 38 where the straps may be provided at one or more levels as shown. Although first and second cable assemblies 36, 38 are shown, in alternate aspects only a single cable assembly may be provided, for example where one end of straps 32 are coupled to cable assembly 38 and the other to vertical support 22. Referring also to FIG. 3, there is shown a partial end view of a mechanical guard blocking apparatus 10. Strap 32 may be a suitable polyester strap or any suitable material with or without shock absorbing locally with each strap. The ends 44, 46 of the strap 32 may have shackles or snap hooks that interface with eyes fixed to the structure or directly to the cable. Alternately one end of the strap may have a fixed anchor that may be fixed or swivel mounted to one of the cables or one side of the structure so the strap can be unlatched at one end but fixed at the fixed end. The end(s) of the strap 32 with the snap hook may be configured where the hook is a carabiner or double action snap hook or any suitable hook. Here, the hook may or may not have provisions for lockout tagout and the structure or cable adjacent the hook may have a sensor 52 (on one or both sides) that detects presence of the hook(s) and thus detects presence of the strap. The sensor or detector may also detect the event of a crash where proximity of the strap/hook/cable with respect to the structure changes as a result of the strap displacing upon impact. In one aspect, no sensors are provided, for example the strap(s) can be used without individual blocker (strap displacement) detection. In one aspect straps 32 are coupled at both ends to cables where alternately one or all straps can be permanently fixed or bolted shut or permanently open such as with decks or workstations. In alternate aspects, strap(s) may be added to the system manually, added after a human enters the system in combination with a safety plan to close/open levels and reestablish a boundary of a safety zone. Here, straps may be deployed alone with structure or in combination with the cable system disclosed in any suitable orientation to establish safe areas and zones and to absorb energy related to impact and block moving robotics or other articles. By way of example, straps 32 may be deployed as "permanent static horizontal blocker(s)" "temporary static horizontal blocker(s)" or "temporary dynamic vertical blocker(s)" where the latter may employ actuators to safely open and close a given access point such as an opening in a cat walk; i.e. a dynamic catwalk blocker. The disclosed technology applies to the instance for horizontal blocking of robots i.e. "temporary static horizontal blocker(s)". FIGS. 1 & 2 show 7 straps 32 and 11 pairs of locations to mount straps. In alternate aspects, more or less straps and pairs of locations to mount straps may be provided. In the embodiment shown between 1 and 11 straps may be provided at their respective mounting location 62. Each mounting location 62 has two u-bolts 66, 68, eyes or other suitable structure grounded to the vertical support to thread cable 36 or 38 as the case may be. Between u-bolts 66, 68 the end of a given strap 32 may be hooked or fastened to the cable that is threaded through where pulling on the strap will cause the cable to also extend between the u-bolts 66, 68 as the strap is displaced. The cable assemblies 36, 38 are provided where displacement of a given strap at both ends provides a proportional displacement of the cable at the end of the strap it is coupled to in order to absorb energy associated with the displacement. Cable assembly 36 will be described where cable 38 may have similar features. Cable assembly 36 has cable 74 which is terminated/grounded 76 at horizontal member 26. Pulley 82 and 84 are shown connected by extension spring 86 where cable 74 is threaded through pulley 82. Cable 74 extends up through pulley 92 where pulley 92 is grounded to cross member 26. Cable 74 then extends down and is threaded through the u-bolts on vertical member 22. Cable 74 then extends up through pulley 84 and is terminated and grounded 96. Although there is slack shown in cable 74, there may be no slack and the cable may be preloaded by a combination of grounding the terminations of cable 74 with extension of spring 86. Spring 86 may be used alone or in combination with shock absorbing structure. Cable assembly 36 as described will absorb energy associated with any of the straps that are displaced where a single cable assembly 36 acts as a single energy absorber that absorbs energy from one or more straps or any source of displacement of the cable where a strap is located on the vertical member 22. Sensor(s) 102 may be provided to detect displacement or extension of the spring also to detect a crash or displacement of any of the straps. Alternately load cells may be provided to detect the load that displaces the spring. Although cable assembly 36 is shown as described, any suitable cable configuration or absorber that will absorb energy associated with any of the straps that are displaced may be provided. In embodiments, a single absorber acts as a single energy absorber that absorbs energy from one or more straps or any source of displacement of the cable where a strap is located on the vertical member 22. Here, cable assembly 36 takes the horizontal kinetic energy from the bot and turns it into vertical tension in the lines or cables and uses a merely exemplary version of a vertically oriented spring to provide a reactionary force and dissipate that energy over a specified distance to reduce the overall impact load on the system to which it is mounted. The result allows the overall system to be lighter and less expensive than reinforcing structure to absorb the energy, as well as provides a way with the strap connections to quickly account for a multitude of different system configurations.

Figure 4:
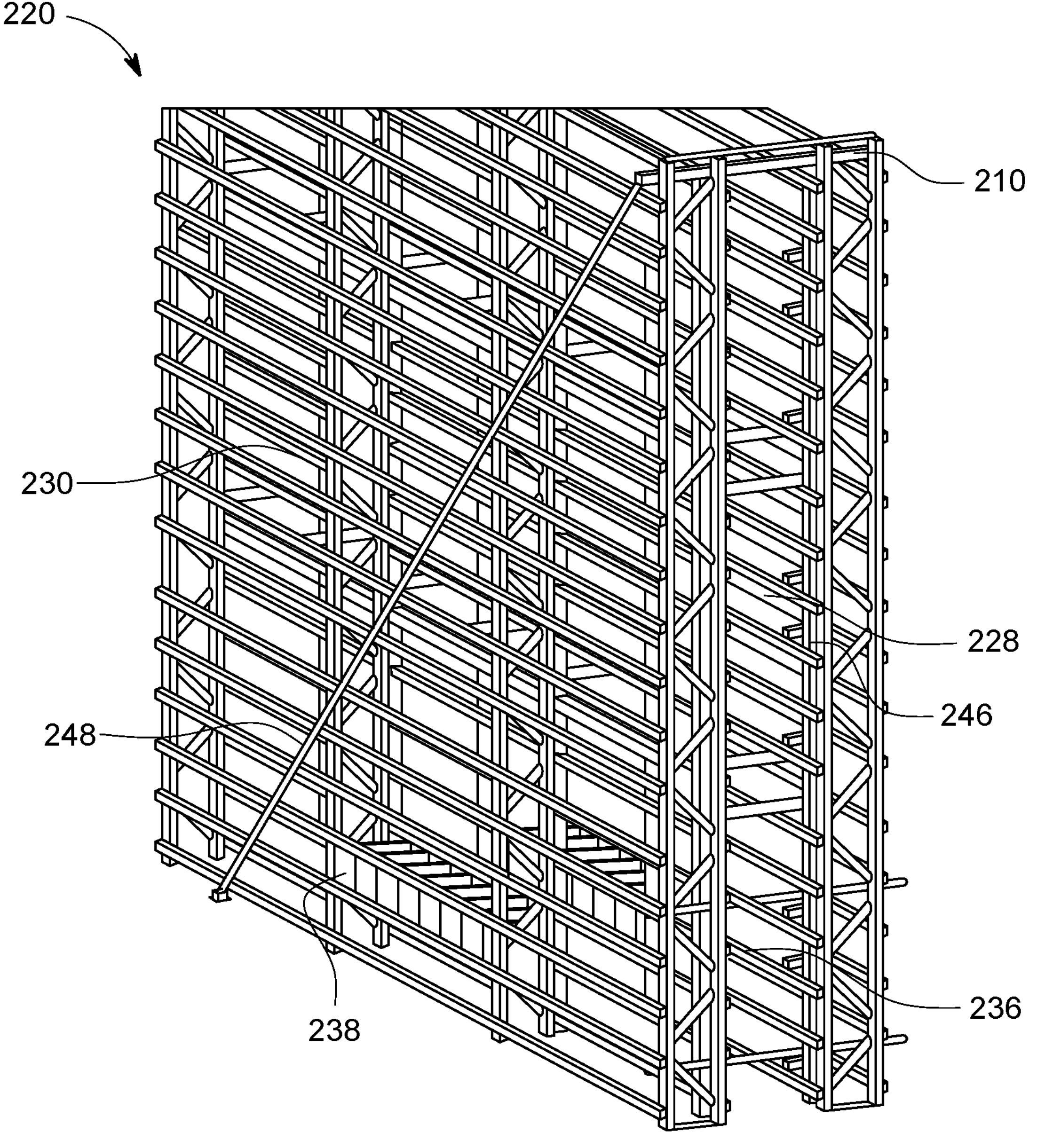
FIGS. 4-7 are end, plan and isometric views of a mechanical guard blocking apparatus according to further embodiments of the present technology.
Figure 5:
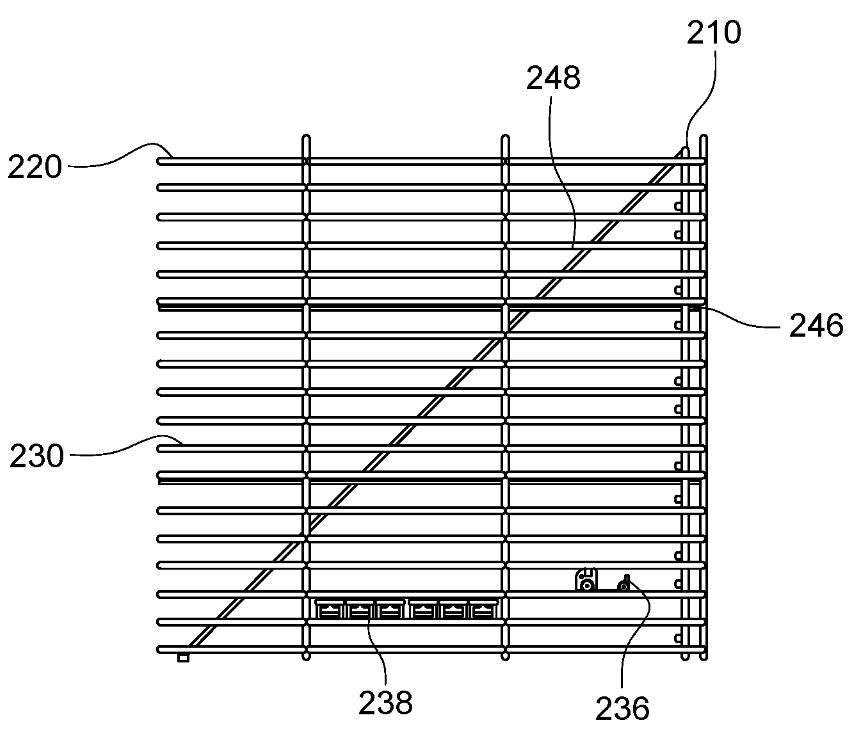
Figure 6:
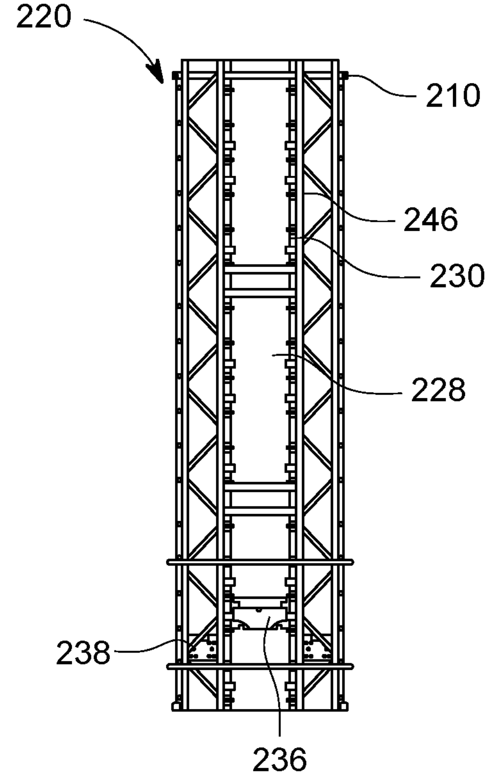
Figure 7:
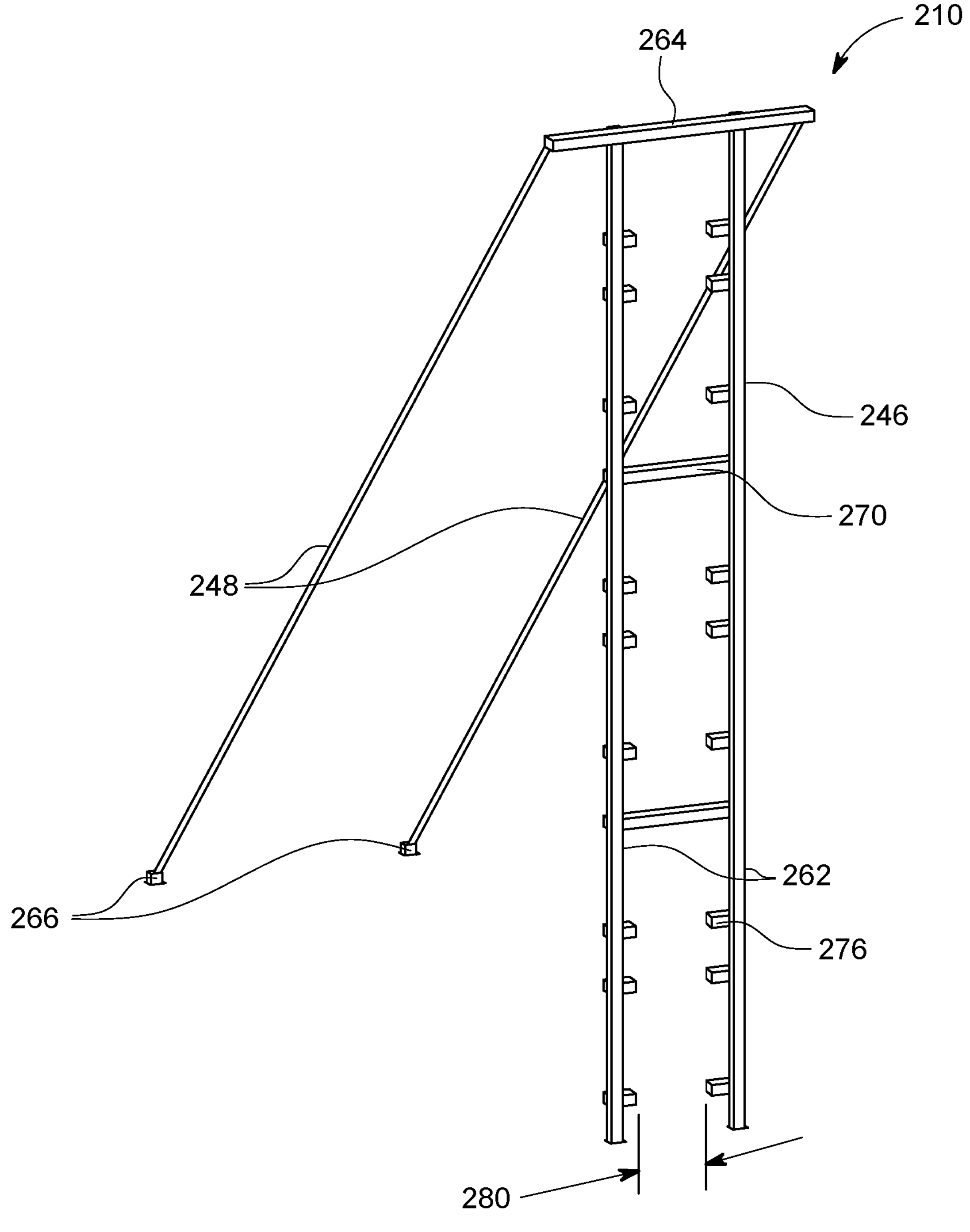

Referring now to FIG. 4 there is shown an isometric view of a mechanical guard blocking apparatus 210 integrated at an end of storage structure 220. Referring also to FIG. 5 there is shown a side view of a mechanical guard blocking apparatus 210 integrated at an end of storage structure 220. Referring also to FIG. 6 there is shown an end view of a mechanical guard blocking apparatus 210 integrated at an end of storage structure 220. Storage structure 220 shows the end on an aisle 228 that has rails 230 at multiple levels to support autonomous robot(s) 236 which move along the length of the rows 230. Totes 238 may be stored on shelves at the multiple levels adjacent rails 230 where robot 236 is configured to selectively pick and place totes 238. Mechanical guard blocking apparatus 210 has vertical frame 246 and braces 248 where both vertical frame 246 and braces 248 are fixed to the concrete floor and where mechanical guard blocking apparatus 210 is provided at the end of structure 220 to absorb the impact of a runaway robot 236 in such event. As both vertical frame 246 and braces 248 are fixed to the concrete floor, mechanical guard blocking apparatus 210 is supported independent of structure 220 where the loads associated with impact of a runaway robot 236 are directed to the floor or mounting surface and are absorbed independent of structure 220. Referring also to FIG. 7, there is shown an isometric view of a mechanical guard blocking apparatus 210. Vertical frame 246 has vertical members 262 with the bases coupled to the floor. Horizontal member 264 is fixed at the top of vertical members 262 and coupled to the end of braces 248 where the opposing end of braces 248 are anchored 266 at the concrete floor or base. Braces 248 may be rigid steel rods, tubing or any suitable material with suitable strength to absorb the impact. In alternate aspects, braces 248 may not be provided or may be provided where apparatus 210 is integrally formed or coupled to structure 220. Horizontal members 270 may further be provided to couple vertical members 262 at intervals. In the disclosed bot blocker 210, there are no straps as shown in structure 10 (although they could be done as an alternate). Instead, mechanical guard blocking apparatus 210 has energy absorbing mechanical guards in the form of stub pieces 276 fastened to vertical members 262 that extended into the way of the port and starboard sides of the bot such that the robot impacts stub pieces 276 and transfers the impact from stub pieces 276 through frame 246 and members 248 to the floor. Of note is gap 280 formed between stub pieces 276 that may be provided for service access by service personnel. Here, the stub pieces 276 are always there and extend in to catch, for example, approximately 2" of each side of the robot. When an operator needs to enter the system, there is sufficient room through gap 280 for them to pass between the stub pieces 276 without removing them. Stub pieces 276 may be welded, bolted or otherwise fastened onto the upright tubes 246 so they may be configured where they are needed, and omitted as needed, such as a level where bots proceed onto transit decks. Additionally, bolting locations may be provided on the uprights 246 to temporarily add stubs or full cross-bars as temporary static horizontal blockers to transit decks or transit rails when it is required to isolate the movement of bots between these areas, such as for maintenance activities. Theses temporary static horizontal mechanical blocking members bot blockers may include a safety interlock switch, lock or otherwise that can be integrated with the system safety PLC as the exemplary described safety zone application. Here, tubes 276, 246 can bend as well as absorb torsional loading of the stubs without yielding upon impact of a bot.

Figure 8:
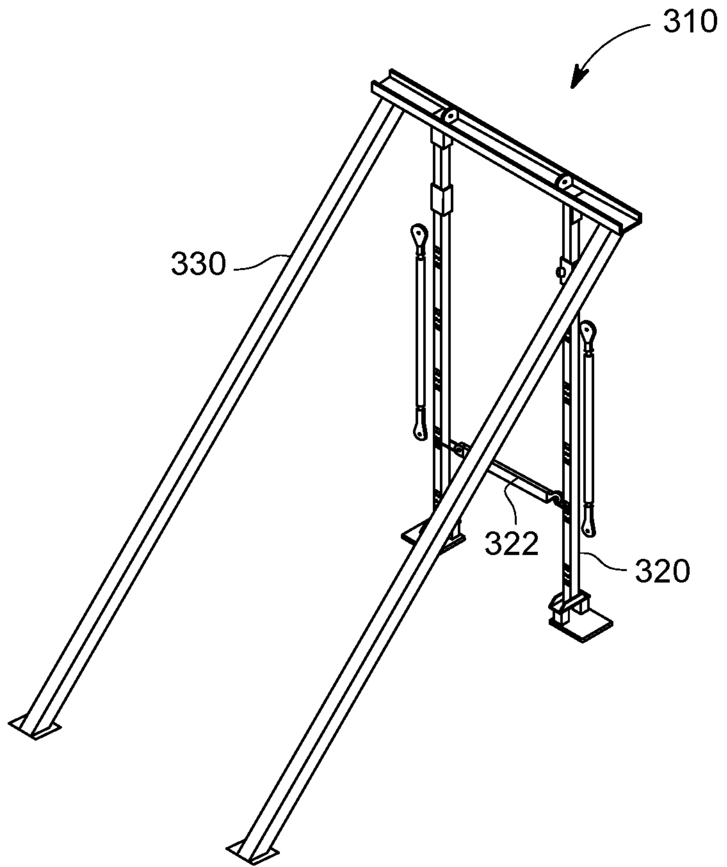
FIG. 8 is an isometric view of a mechanical guard blocking apparatus according to further embodiments of the present technology.

Referring now to FIG. 8, there is shown an isometric view of an energy absorbing mechanical guard blocking apparatus 310. Apparatus 310 may have blocking and impact absorbing features as described with respect to both apparatus 10 and 210. Here, mechanical guard blocking apparatus 310 has vertical supporting structure 320 with safety straps 322 as disclosed with respect apparatus 10 but also with the braces 330 as disclosed with respect to apparatus 210.

Figure 9:
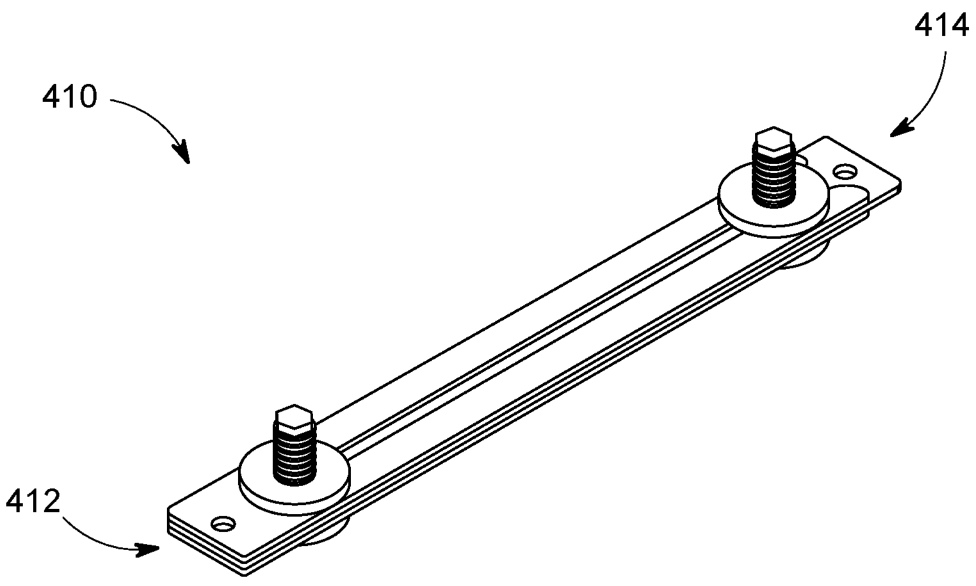
FIGS. 9-11C are isometric, plan, cross-sectional and top views of an impact absorbing mechanical apparatus for use within a mechanical guard blocking apparatus according to further embodiments of the present technology.
Figure 10:
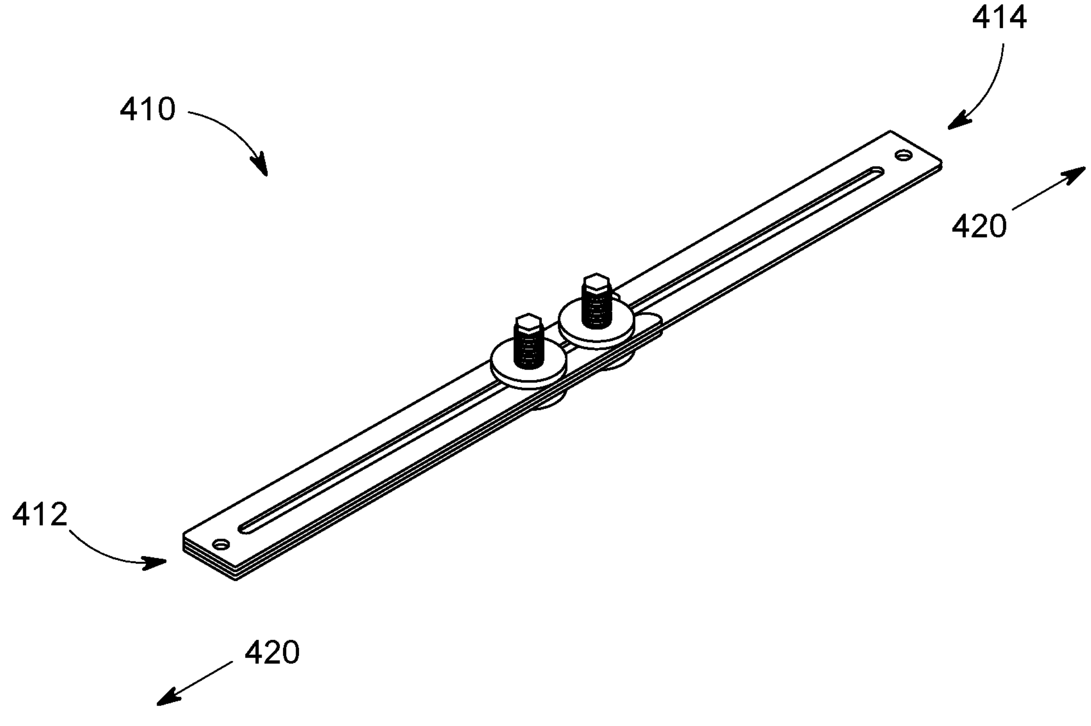
Figure 11A:
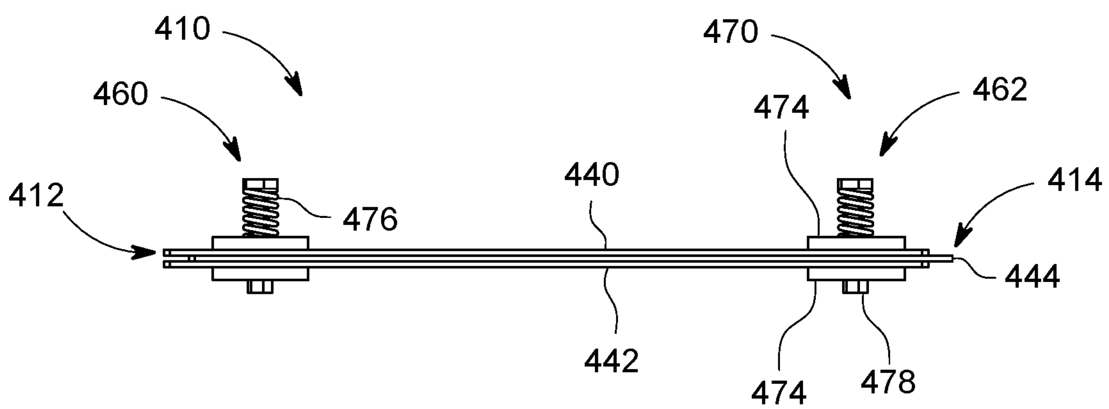
Figure 11B:
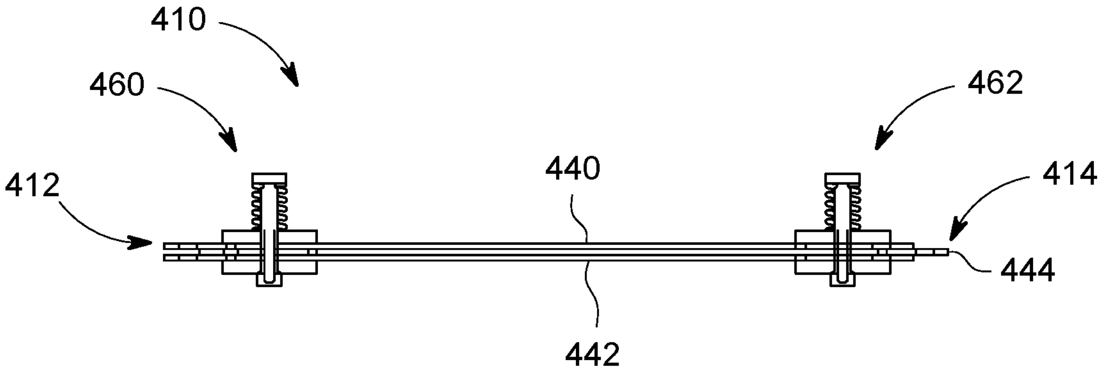
Figure 11C:
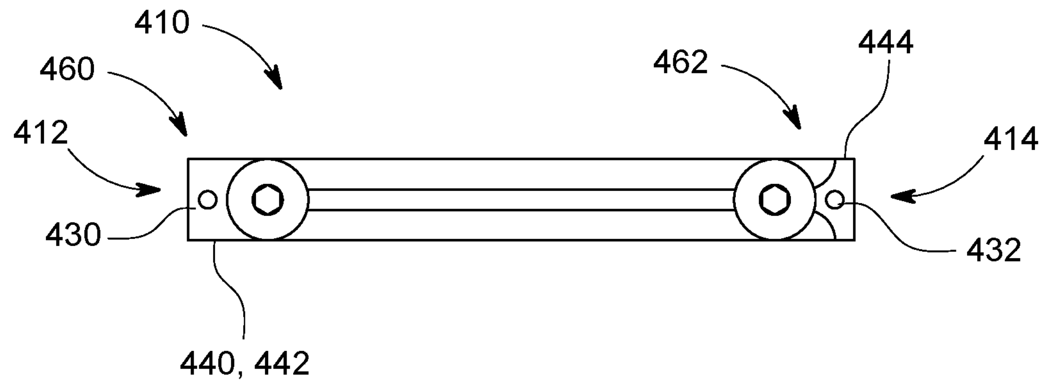

Referring now to FIG. 9 there is shown an isometric view of an impact absorbing mechanical apparatus 410 in a compressed state or condition. Referring also to FIG. 10 there is shown an isometric view of an impact absorbing mechanical apparatus 410 in an extended state or condition. Impact absorbing mechanical apparatus 410 is configured to absorb energy from impact where first and second ends 412, 414 may be coupled at one end to a static member and at the other end a dynamic or moving member to absorb the energy. Alternately, both ends may be suitably displaced to absorb impact energy. By way of non-limiting example, end 412 may be coupled to a storage structure and end 414 may be coupled to a bar or strap configured to be impacted by a run-away robot where impact absorbing mechanical apparatus 410 displaces, for example, extends as shown from FIG. 9 to FIG. 10. Here, FIG. 9 shows where apparatus 410 is collapsed which is the starting position and FIG. 10 shows where apparatus 410 is extended which is a position after an event. By way of further non limiting example, impact absorbing mechanical apparatus 410 may be applied with the same function replacement for an extending gas cylinder that slows a robot where one end would be grounded to the rail or structure and the other displaced to absorb the impact force generated by stoppage of the run-away robot. Here, impact absorbing mechanical apparatus 410 may be installed as a gas cylinder may be pins at either end 412, 414 and be replaceable quickly in the event of a robot stop incident. Referring also to FIG. 11A there is shown a side view of an impact absorbing mechanical apparatus 410 in a compressed state or condition. Referring also to FIG. 11B there is shown a side section view of an impact absorbing mechanical apparatus 410 in a compressed state or condition. Referring also to FIG. 11C there is shown a top view of an impact absorbing mechanical apparatus 410 in a compressed state or condition. Eyes 430, 432 are provided at ends 412, 414 respectively to pin or otherwise fasten apparatus 410 to members as described. Eyes or holes 430 extend through outer members 440, 442 where eyes or hole 432 extends through inner member 444. Outer and inner members 440, 442, 444 may be fabricated from steel or other suitable material and may each have an elongated slot as shown. In the compressed condition, two clamping members 460, 462 are fastened to the ends of the slots in the stack of outer and inner members 440, 442, 444. Each member 460, 462 may have shoulder bolts 470, washers 474, compression springs 476 and nuts 478. Although members 460, 462 are described with the hardware disclosed, any suitable combination of mechanical components may be provided to apply opposing normal forces to the stack of outer and inner members 440, 442, 444. For example, instead of compression springs 476, wave springs or simply providing elastic washers or any suitable device may be provided. It is noted that members 460, 462 displace during an impact event as shown in FIGS. 9 and 10. Here, the material coefficient of friction vs the surfaces in compression between the springs provides an opposing force 420 as the ends 412, 414 are displaced. While the force may be substantially constant with displacement where outer and inner members 440, 442, 444 have uniform thickness, alternately outer and inner members 440, 442, 444 may have a non-uniform thickness such that the force may vary as desired based on the displacement and effective compression of springs 476. Here, metal components are shown arranged lengthwise with a slot running down the center, attached by shoulder bolts, washers, and compression springs to provide a normal force between the materials and results in a reaction force 420 determined by the friction of the materials and the preload. Where outer and inner members 440, 442, 444 in aggregate have uniform thickness, the reaction force 420 from extending these sections lengthwise along the slot results in a relatively constant force throughout the extension that functions in the same way as the spring element.

In the embodiments of the energy absorbing mechanical guard described above, the energy absorbing mechanical guard is configured to block or stop a mobile robot, traveling at a maximum rate of speed for the mobile robot, without damaging the mobile robot. As described, energy absorbing mechanical guard may be configured with compliant, energy absorbing materials, that absorb the kinetic energy of the mobile robot to block or stop the mobile robot with a rate of deceleration that stops the mobile robot without damage to the mobile robot.

It should be understood that the foregoing description is only illustrative. Various alternatives and modifications can be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances.

What is claimed is:

1. A system for stopping mobile robots moving in a structure, the structure comprising multiple levels, the system comprising:

an energy absorbing mechanical guard configured to affix to a structure within which the mobile robots move, and configured to stop the moving mobile robots upon impact with the energy absorbing mechanical guard; and a sensor for monitoring displacement of the energy absorbing mechanical guard for identifying mobile robot contact with the energy absorbing mechanical guard;

wherein the energy absorbing mechanical guard is configured to span at least some of the multiple levels of the structure.

2. The system of claim 1, wherein the energy absorbing mechanical guard comprises a spring configured to absorb kinetic energy of a mobile robot and dissipating the kinetic energy.

3. The system of claim 1, wherein the energy absorbing mechanical guard comprises a strap configured to absorb kinetic energy of a mobile robot and dissipate the kinetic energy.

4. The system of claim 1, wherein the energy absorbing mechanical guard comprises a cable configured to absorb kinetic energy of a mobile robot and dissipate the kinetic energy.

5. The system of claim 1, wherein the energy absorbing mechanical guard comprises a stub configured to absorb kinetic energy of a mobile robot and dissipate the kinetic energy.

6. The system of claim 1, wherein the energy absorbing mechanical guard comprises a strap configured to be impacted by a mobile robot and stop the mobile robot, and one or more cables affixed to one or more ends of the strap, the strap and one or more cables configured to absorb kinetic energy of the mobile robot and dissipate the kinetic energy.

7. The system of claim 6, wherein contact of a mobile robot with the strap displaces the strap, displacement of the strap in turn displacing the one or more cables at the one or more ends of the strap.

8. The system of claim 6, wherein the strap is one of a plurality of straps mounted to the one or more cables at a plurality of different levels of the structure.

9. The system of claim 6, wherein the strap is formed polyester.

10. The system of claim 6, further comprising pulleys, wherein the one or more cables are looped by the pulleys to span the multiple levels of the structure multiple times, the pulleys and multiple spans of the one or more cables increasing a length of the one or more cables available to absorb and dissipate the kinetic energy of the mobile robot.

11. The system of claim 10, wherein the pulleys are mounted by springs to fixed positions on the structure, the springs configured to further absorb and dissipate the kinetic energy of the mobile robot.

12. The system of claim 6, wherein the sensor is configured to sense displacement of the strap to identify contact of a mobile robot with the strap.

13. The system of claim 1, wherein the structure comprises storage shelves arrayed in multiple aisles, and rails in the multiple aisles along which the mobile robots are configured to travel, the energy absorbing mechanical guard defining isolated service zones, wherein the energy absorbing mechanical guard prevents a mobile robot from crossing between the isolated service zones.

14. The system of claim 13, wherein sizes of the isolated service zones may be dynamically configured by changing a configuration of the energy absorbing mechanical guard.

15. The system of claim 1, wherein the energy absorbing mechanical guard comprises a vertical frame mounted adjacent the structure, and an angled brace mounted at one end to the vertical frame and at a second end to floor on which the structure is supported.

16. The system of claim 15, wherein the vertical frame and angled brace are mounted independently of the structure.

17. The system of claim 16, further comprising horizontal stubs mounted at positions along the vertical frame, the horizontal stubs spaced from each other on first and second opposed vertical sides of the vertical frame, and the horizontal studs configured to receive impact from a mobile robot.

18. The system of claim 17, wherein the studs on the first and second opposed vertical sides of the vertical frame are spaced from each other sufficiently to allow personnel to pass between the studs on the first and second opposed vertical sides of the vertical frame.

19. A system for stopping mobile robots in manufacturing facility, the system comprising:

a storage structure used to store inventory for an automatic storage and retrieval system, the storage structure comprising multiple levels for storing inventory, the storage structure having an end at which the multiple levels terminate;

an energy absorbing mechanical guard configured to affix to the end of storage structure, the energy absorbing mechanical guard further configured to stop the moving mobile robots upon impact with the energy absorbing mechanical guard; and a sensor for monitoring displacement of the energy absorbing mechanical guard for identifying mobile robot contact with the energy absorbing mechanical guard;

wherein the energy absorbing mechanical guard is configured to span at least some of the multiple levels of the storage structure.

20. The system of claim 19, further comprising an impact absorbing mechanical apparatus affixed to the energy absorbing mechanical guard configured to absorb kinetic energy of a mobile robot and dissipate the kinetic energy.

21. The system of claim 20, wherein the impact absorbing mechanical apparatus includes a first member affixed to the storage structure and a second member affixed to one of a strap, cable or stub of the energy absorbing mechanical guard, wherein the first and second members are frictionally biased against each other by a clamping member that allows movement of the first and second members with respect to each other, while absorbing energy of the movement of the first and second members with respect to each other.

22. The system of claim 21, wherein the clamping member comprises a spring loaded fastener biasing the first and second members against each other.

23. The system of claim 19, wherein the energy absorbing mechanical guard comprises a strap configured to be impacted by a mobile robot, and a pair of cables affixed to opposed ends of the strap, the strap and pair of cables configured to absorb kinetic energy of the mobile robot and dissipate the kinetic energy.

24. The system of claim 23, wherein contact of a mobile robot with the strap displaces the strap, displacement of the strap in turn displacing the pair of cables at the opposed ends of the strap.

25. The system of claim 23, further comprising pulleys, wherein the one or more cables are looped by the pulleys to span the multiple levels of the storage structure multiple times, the pulleys and multiple spans of the one or more cables increasing a length of the one or more cables available to absorb and dissipate the kinetic energy of the mobile robot.

26. The system of claim 23, wherein the sensor is configured to sense displacement of the strap to identify contact of a mobile robot with the strap.

27. A method of blocking mobile robots in an automatic storage and retrieval system, comprising:

configuring an energy absorbing mechanical guard with multiple energy absorbers;

positioning the energy absorbing mechanical guard within a storage structure of the automatic storage and retrieval system, or at an end of the storage structure of the automatic storage and retrieval system, to span multiple levels of the storage structure, the energy absorbing mechanical guard aligning the energy absorbers on the multiple levels of the storage structure;

blocking mobile robots on the multiple levels of the storage structure by receiving a mobile robot on a level and absorbing the kinetic energy of the mobile robot to stop the mobile robot with a rate of deceleration that stops the mobile robot without damage to the mobile robot; and detecting, with a sensor, displacement of the energy absorbing mechanical guard for identifying contact of a mobile robot with the energy absorbing mechanical guard.

* * * * *